US005309863A

United States Patent [19]

Leeb, Jr.

[11] Patent Number: 5,309,863

[45] Date of Patent: May 10, 1994

[54] FIRE SAFETY WINDOW AND INTERIOR DOOR MARKER

[76] Inventor: Robert H. Leeb, Jr., 324 Fourteenth St., West Babylon, N.Y. 11704

[21] Appl. No.: 11,771

[22] Filed: Feb. 1, 1993

[51] Int. Cl.[5] ..... G01D 11/00

[52] U.S. Cl. ..... 116/205; 116/DIG. 17; 359/871

[58] Field of Search ..... 116/205, DIG. 17; 40/570, 630, 594; D6/300, 309; 359/838, 871; 428/912.2

[56] References Cited

U.S. PATENT DOCUMENTS 2,037,773 4/1936 Eynon ..... 40/208

2,200,168 5/1940 Goldberg ..... 359/838

4,385,586 5/1983 Schriever ..... 116/205

4,401,050 8/1983 Britt et al. ..... 116/205

*Primary Examiner*—William A. Cuchlinski, Jr.
*Assistant Examiner*—W. Morris Worth
*Attorney, Agent, or Firm*—Galgano & Burke

[57] ABSTRACT

A fire safety interior door marker including a plate with a front side and a rear side. The front side has a reflective surface area and a tactile surface area. The rear side of the plate is provided with an adhesive backing, normally covered by a release sheet, for securing the plate to an exit door or beneath a window Also disclosed is a method for visually and tactually indicating the location of an escape door or window for use during a fire in a building.

8 Claims, 3 Drawing Sheets

Fig. 1
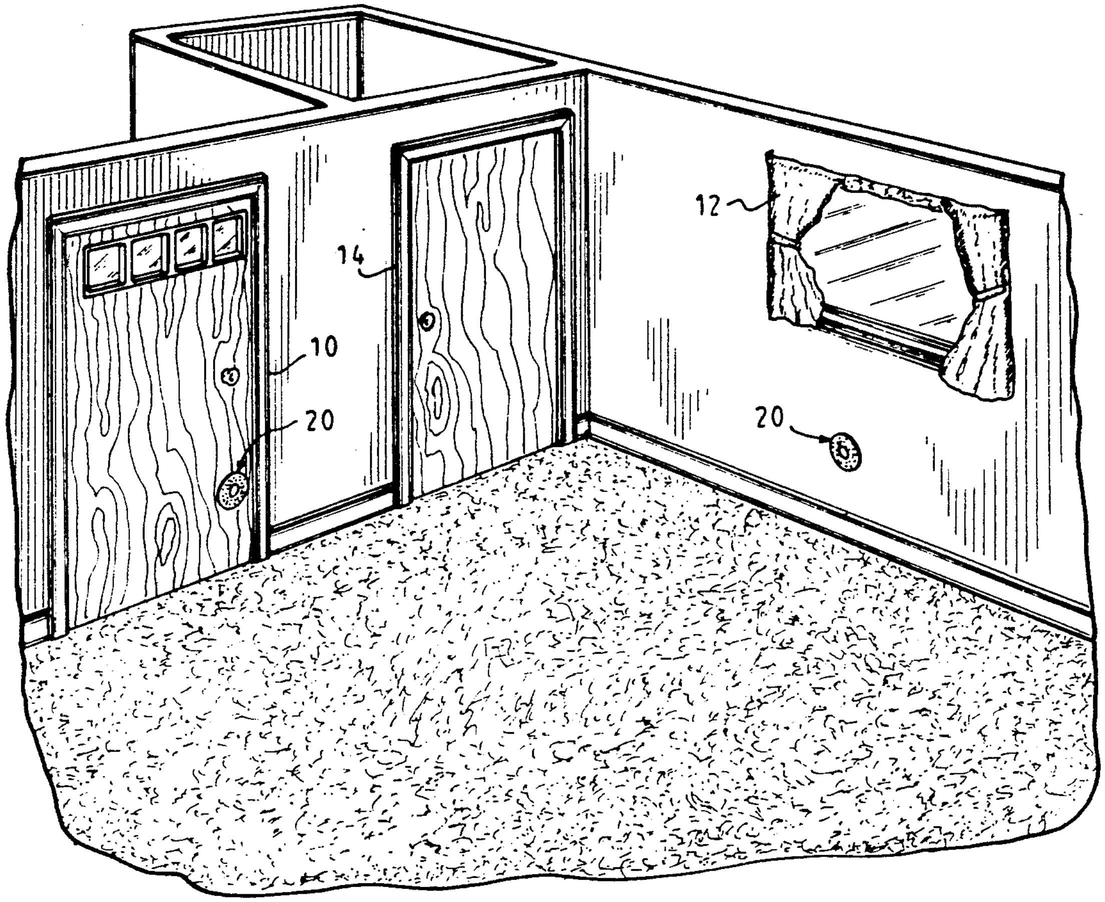
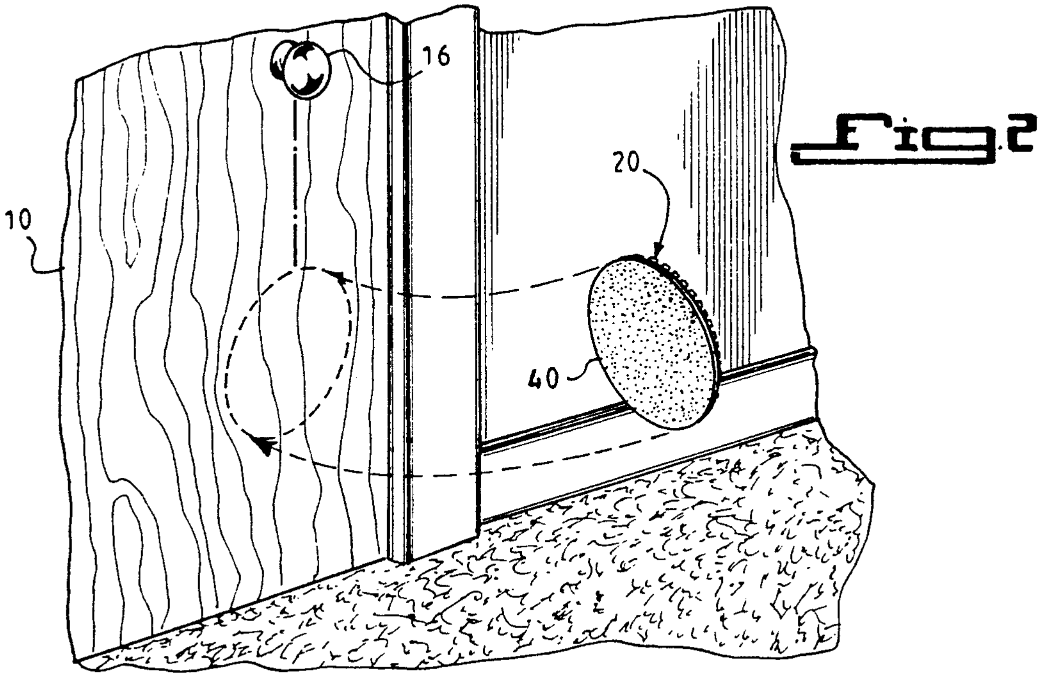
Fig. 2

Fig. 5
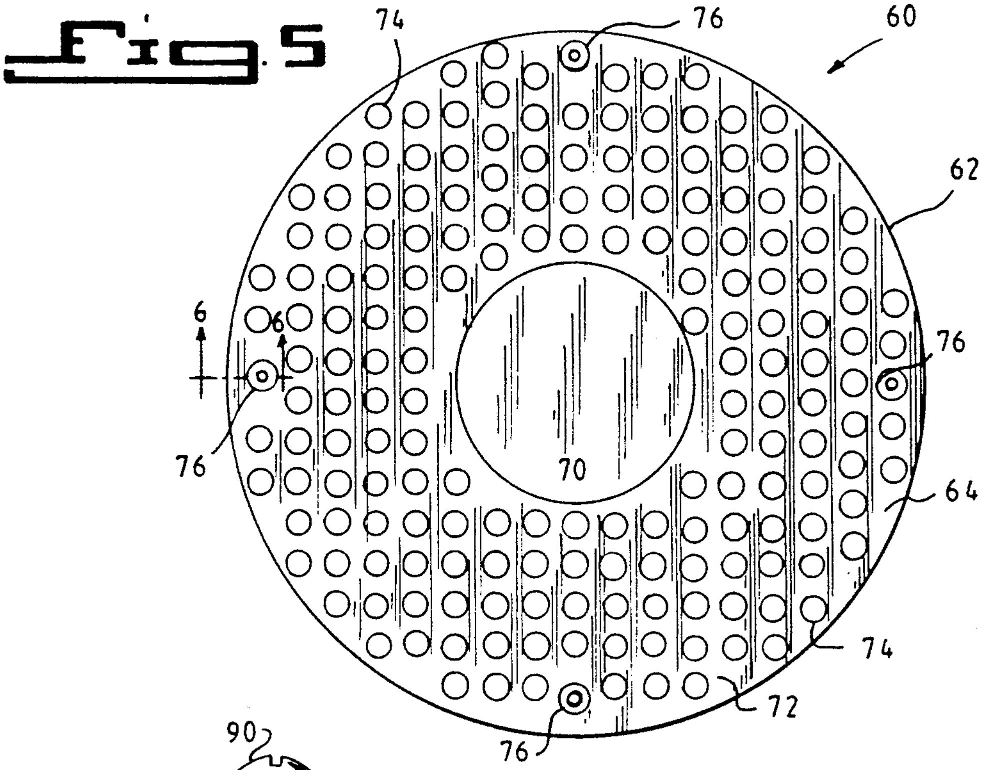
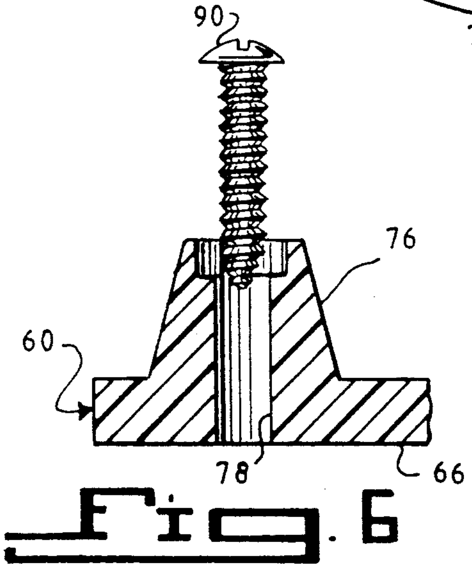
Fig. 6
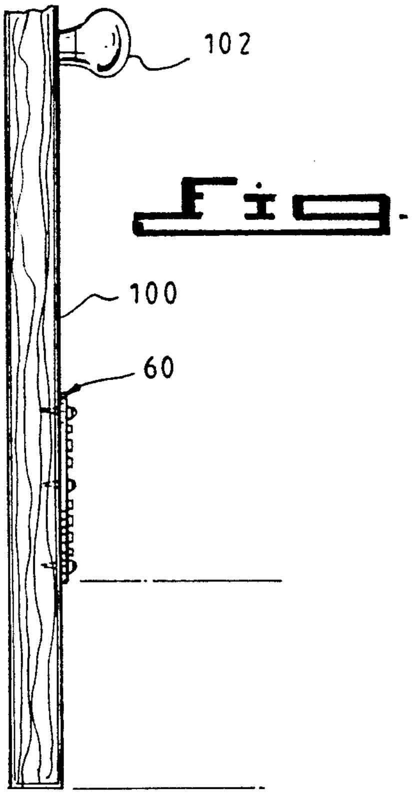
Fig. 7

FIRE SAFETY WINDOW AND INTERIOR DOOR MARKER

BACKGROUND OF THE INVENTION

The present invention relates generally to an emergency window or door exit marker. More particularly this invention relates to a fire safety window or interior door marker for identifying emergency windows or door exits in the event of a fire emergency for safe escape of inhabitants therein.

Loss of life which occurs because of fire in a home or building is often caused not by the fire or flames but instead by the subsequent smoke and toxic gases that ar produced. Occupants of a building on fire are often disorientated from the smoke and are unable to find a safe exit. They often find themselves trapped in a closet, bathroom or in a corner of a room where they fall victim to smoke inhalation. The National Fire Protection Association states that if one must exit through smoke, the cleanest air will be several inches off the floor and one should crawl on their hands and knees to the nearest safe exit.

A number of devices have been disclosed for directing occupants of a building toward an exit. For example, U.S. Pat. No. 3,665,626 granted to Lund et al., discloses the commonly observed exit sign. The exit sign generally includes a light transmitting visual image of the word "EXIT" in capital letters with light transmitting visual images of arrows underneath pointing in the appropriate direction toward the nearest exit door or stairway. U.S. Pat. No. 2,480,584 granted to Kohlhauer et al., discloses a luminous and luminescent sign which can be adapted to display the letters "EXIT" for visually directing one to an exit. Instead of light transmitting signs, light reflective plates and composite contrast color embedded displays, U.S. Pat. No. 3,973,342 granted to Gubela and U.S. Pat. No. 3,506,528 granted to Dean, respectively, can also be configured as exit signs. So far as is known these signs are typically installed in the halls of office buildings, schools, hotels, etc., attached to the ceiling where smoke naturally rises and accumulates rendering these devices inoperable and thus ineffective during a fire.

Further, a number of fire safety escape route markers have been devised for directing occupants in a hallway to a safe exit in the event of a fire. For example, U.S. Pat. No. 4,385,586 granted to Schriever, discloses an escape route rescue system which employs a series of devices, each of which has tactile characteristics of shape and surface contacts in combination which attach to the middle and lower part of the wall to indicate direction and distance to the nearest evacuation exit. The generally arrow shaped member provides directional information and contact points provide distance information. The device is also capable of luminescence to aid in visual as well as tactile reference.

Another example, U.S. Pat. No. 4,401,050 granted to Britt et al., discloses a phosphorescent escape route indicator which has an adhesive back for attaching to an escape route wall above the floors and stairways. The directional indicators are shaped like arrows which project outwardly or are otherwise raised or embossed to allow the same to be felt even after the phosphorescent glow disappears.

Also of interest is U.S. Pat. No. 259,544 granted to Howard which discloses a means for facilitating speedy exit from buildings in case of fire or alarm which has a tactile means in the form of a rail for guiding a person to an exit.

In theory, these devices provides a system for directing the occupant of a burning building to a safe exit, however, they are also cumbersome and confusing. Specifically, the markers are numerous, and in the event of a real emergency the occupant would be less likely to decipher the direction or, as in Schriever, decipher the contact points determining the number of doors to the true safe exit door without undue waste of time. In the case of dense smoke, if a trapped occupant uses the markers to determine direction by touch, he or she would have to pass by the exit door in order to determine that the markers point in the opposite direction on the other side of the door, thus increasing the time one would need in order to escape. In the event of a fire emergency, every second is critical and the delay of even a split second could be fatal to the occupant trapped inside.

However, there is still a need for a simple and effective marking device for directing a trapped occupant of a bedroom, office, hospital room, hotel room, classroom, etc., of a burning structure, to a safe exit door or window whether or not there is sufficient ambient light.

SUMMARY OF THE INVENTION

Accordingly, it is an object of the present invention to provide an improved fire safety marker which provides both visual and tactile reference to allow a trapped occupant in a room o hallway during a fire to immediately identify a window or safe exit door.

It is also an object of the present invention to provide such a fire safety marker which is easily attached to the bottom of a door below the handle so that in the event of smoke, the marker can be viewed or touched by one crawling along the floor to identify a window or safe exit door.

It is also a further object of the present invention to provide such a fire safety marker which is of simple construction and which may be manufactured relatively simply and inexpensively.

It is a more particular object of the present invention to provide a method for visually and tactually indicating the location of an escape door in the event of a fire emergency.

Certain of the foregoing and related objects are readily obtained in a fire safety interior door marker including a plate having a front side and a rear side. The front side has a reflective surface area and a tactile surface area. Means for attaching the rear side of the plate to an exit door is included for attachment of the plate to an exit door or beneath a window. Most desirably, the attaching means includes an adhesive backing affixed to the rear side of the plate with an outer covering release sheet.

In a preferred embodiment of the invention the plate is circular in shape wherein the reflective surface area and the tactile surface area are concentric circular areas. Most desirably, the reflective surface area is mirror-like and the tactile surface area includes a multiplicity of spaced-apart protrusions, preferably having a truncated cone-shaped profile discernible by touch. Most advantageously, the tactile surface area is brightly colored and the plate is formed from plastic.

In an alternative embodiment of the invention the attaching means includes the plate having a plurality of spaced-apart holes for acceptance of screws.

Certain of the foregoing and related objects are also readily obtained in a method for visually and tactually indicating the location at least one of an escape door or window for use during a fire in a building structure having a floor and a wall in which a person moves along includes the step of securing a marker plate of the above-mentioned type to the exit door approximately twelve inches from the bottom of the door and generally directly below the door handle and/or under the window.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

In the drawings, wherein similar reference character denote similar elements throughout the several views:

FIG. 1 is a prospective view of the interior of a room in which fire safety markers embodying the present invention are affixed to an exit door and beneath below a window;

FIG. 2 is an enlarged prospective view of the rear side of the fire safety marker with arrows showing installation to a door above the floor and also below the handle;

FIG. 5 is a top view of an alternative embodiment of the fire safety marker;

FIG. 6 is a cross-sectional view taken along line 6—6 in FIG. 5; and FIG. 7 is an elevational side view of an exit door in which the fire safety marker of FIG. 5 is installed thereon.

DETAILED DESCRIPTION OF THE PREFERRED EMBODIMENTS

Figure 3:
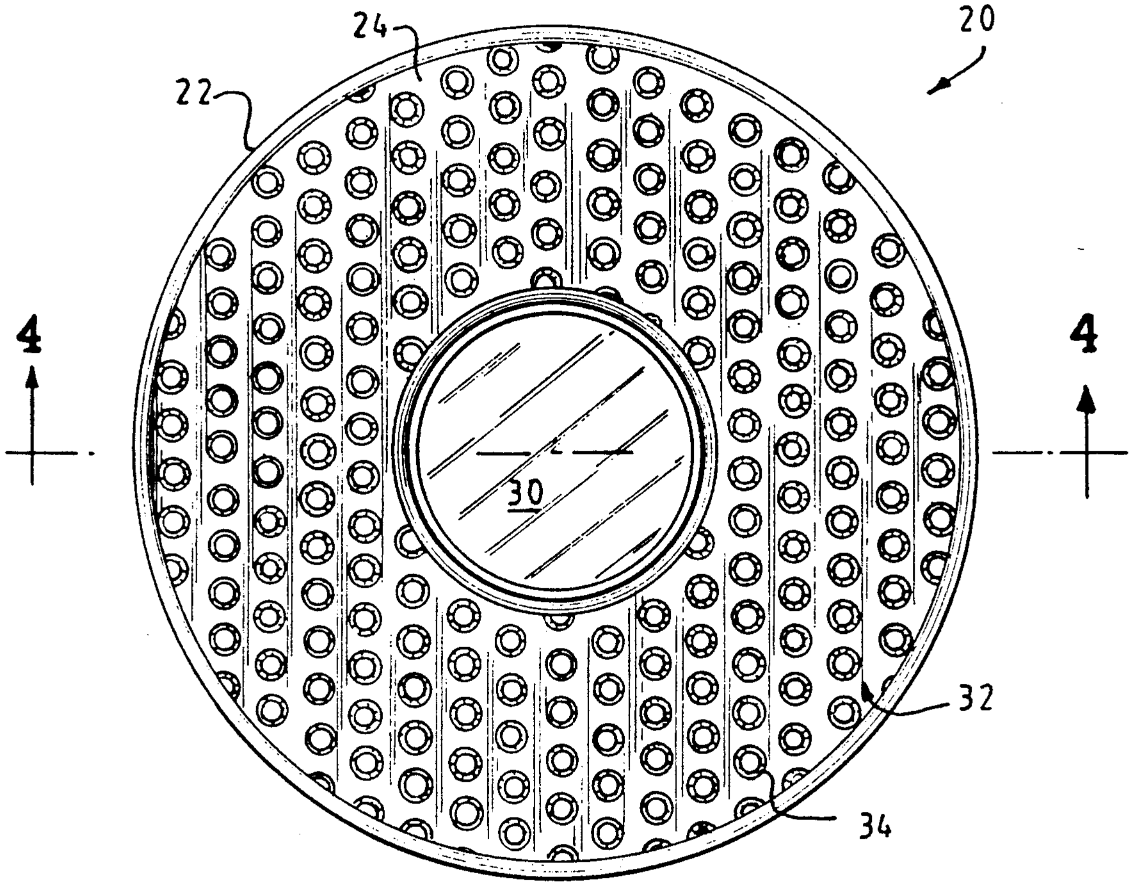
FIG. 3 is a top view of the fire safety marker showing an inner reflective area and an outer surrounding tactile area.

Turning now in detail to the drawing, and in particular to FIG. 1, therein illustrated is a fire safety interior door marker 20 embodyinq the present invention. As shown in FIG. 1, marker 20 is affixed to a safe exit door 10 and below a window 12 thereby providing to the occupant of the room in the event of a fire both a visual and tactile reference for ascertaining the location of an exit door 10 or window 12, thereby permitting safe escape. As can be appreciated, closet door 14 or other doors which do not lead to a safe exit, but where a person could become trapped inside would not be so marked. Marker 20 is attached to exit door 10, or below window 12 adjacent to the floor so as to permit detection in the event the room becomes filled with smoke forcing occupants inside to remain close to or crawl on the floor whereby they would have to locate exit door 10 solely by feeling for exit marker 20. Marker 20 can be attached to exit doors that either exits the building or leads from a room to a hallway.

With reference to FIG. 2, marker 20 is shown affixed to exit door 10 on the main panel approximately 10–12 inches above the floor and generally directly below a handle 16 of the exit door 10. Marker 20 has an adhesive backing 40 in substantially covering relation for easy attachment to exit door 10, or in the case of attachment under a window, to the wall.

Figure 4:
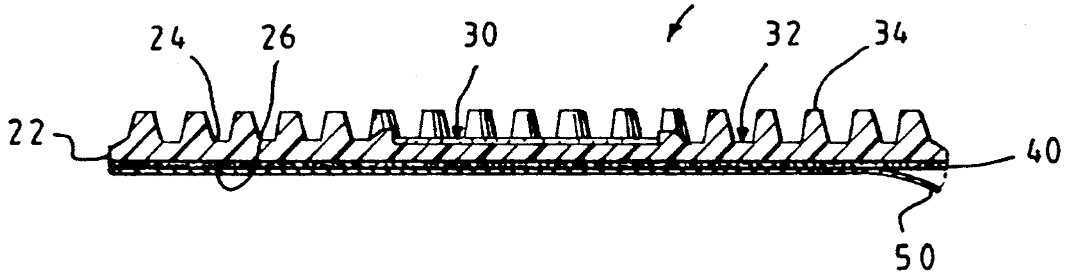
FIG. 4 is a cross-sectional view taken along lines 4—4 in FIG. 3.

Referring now to FIG. 3 and FIG. 4, marker 20 includes a plate 22, an adhesive layer 40 and a protective release sheet 50, the latter of which is peeled off immediately prior to application of the adhesive backed marker 20 to a door or beneath a window. Plate 22 is preferably generally circular in shape having a reflective and tactile front side 24 and a rear side 26 which is affixed to an exit door or beneath a window. Front side 24 has two concentric circular areas. Specifically, inner circular area 30 has a highly reflective surface such as a mirror-like surface made of a highly reflective or luminescent material. Outer circular area 32 has a multiplicity of spaced-apart pimples or protrusions 34 which form a tactile surface. Preferably, the circular diameter of plate 22 is from 7–10 inches in diameter with inner circular area 30 being from 2–3 inches in diameter and outer circular area 32 having protrusions approximately 3/8 inches in height and of a generally truncated cone shape. Plate 22 can be made out of wood, formed metal or plastic. Preferably, the marker is made from injected molded high impact polystyrene or vacuum formed plastic.

Marker 20 is to be fixedly attached to the door or wall by any suitable means intended to be permanent. Referring again to FIG. 4, marker 20 has on its rear surface 26 an adhesive layer 40, and a release sheet 50. Specifically, adhesive layer 40 is sandwiched between marker 20 and release sheet 50 so as to allow easy installation to an exit door by removing release sheet 50 prior to affixing marker 20 to proper position on an exit door.

In operation with sufficient ambient light in the room or with the use of a flashlight, inner reflective surface 30 and outer tactile surface 32 of marker 20 ar easily observed for identifying an exit door. Preferably, outer tactile surface 32 including protrusions 34 is colored, such as bright yellow or the like, so as to be more easily observed in solely ambient light.

In the case where there is insufficient light in the room caused by dense smoke or a power outage, a occupant inside crawling along the floor and the wall can easily recognize the protrusions of marker 20 by touch and know they have reached an exit door. Thus, marker 20 is ideally suited for mounting on the interior of a bedroom door. An occupant of a smoke filled bedroom awoken by an audible alarm that there is a fire may be disorientated and spend vital time trying to locate the escape door. The occupant without guessing and without risking his life more than necessary can with a sweep of his hand locate the marker and determine that the correct exit door is found.

An alternative embodiment of the present invention is shown in FIG. 5–7. In this embodiment, marker 60 is similar to marker 20 of FIGS. 3 and 4 except for the means for attaching the marker to an exit door or beneath a window. As shown in FIGS. 5 and 6, marker 60 includes a circular plate 62 having a reflective and tactile front side 64 and a rear side 66. Front side 64 has two concentric circular areas. Specifically, inner circular area 70 has a highly reflective surface such as a mirror-like surface made of highly reflective or luminescent material. Outer circular area 72 has a multiplicity of spaced-apart pimples or protrusions 74 which form a tactile surface. For attachment of the marker to a exit door or beneath a window, four protrusions 76 approximately equally spaced apart about adjacent outer edge of tactile surface 72 have holes 78 drilled therethrough. As shown in FIG. 6, holes 78 are countersunk so as to accept a screw 90 for attaching to an exit door or beneath a window.

Referring to FIG. 7, marker 20 is affixed to exit door 100 approximately 10–12 inches from the floor and generally directly below a handle 102 so as to be conveniently located for a person crawling along the wall due to insufficient light or smoke and upon detecting the marker alerting the person that this is an exit door.

Although the marker is shown to be circular in shape it will be appreciated by those skilled in the art that the shape of the marker can be rectangular, triangular, oval or any other desired shape. Similarly, the configurations of the protrusions can also be modified to various truncated shapes (e.g., semi-spherical, box-shaped, X-shaped, star shaped, diamond shaped, etc.) and the placement of the protrusions can be in a grid, circular or other pattern so as to be distinguishable from the surrounding surface areas. In addition, the main reflective surface can be curved or concave so as to reflect light back in all directions.

Thus, while only several embodiments of the present invention have been shown and described, it is obvious that many changes and modification may be made thereunto without departing from the spirit and scope of the invention.

What is claimed is:

1. A fire safety interior door and window exit marker comprising:

a plate having a front side and a rear side;

said front side having a reflective surface area and a tactile surface area, one of which is bounded by the other, said tactile surface area including a multiplicity of spacedapart protrusions disposed in a multi-line array; and means for attaching said rear side of said plate to an exit door or beneath a window.

wherein said attaching means includes an adhesive backing affixed to said rear side of said plate with an outer covering release sheet.

2. The marker according to claim 1, wherein said plate is circular in shape.

3. The marker according to claim 2, wherein said reflective surface area and said tactile surface areas are concentric circular areas.

4. The marker according to claim 3, wherein said tactile surface area includes a multiplicity of spaced apart protrusions discernible by touch.

5. The marker according to claim 1, wherein said protrusions have a truncated cone-shaped profile.

6. The marker according to claim 5, wherein said plate is formed from plastic.

7. A fire safety interior door and window exit marker comprising:

a plate having a front side and a rear side;

said front side having a reflective surface area and a tactile surface area, one of which is bounded by the other, said tactile surface area including a multiplicity of spaced-apart protrusions disposed in a multi-line array; and means for attaching said rear side of said plate to an exit door or beneath a window, wherein said attaching means includes said plate having a plurality of spaced-apart holes for acceptance of screws.

8. A method for visually and tactually identifying an escape door or window for use during a fire in a building structure having a floor and a wall in which a person moves along comprising the steps of:

securing a fire safety exit marker comprising a plate having a reflective surface area and a tactile surface area, one of which is bounded by the other, said tactile surface area including a multiplicity of spaced-apart protrusions disposed in a multi-line array onto a room exit door, or directly beneath an exit window, approximately twelve inches above the floor.

* * * * *